(12) United States Patent
Yoon

(10) Patent No.: US 12,522,244 B2
(45) Date of Patent: Jan. 13, 2026

(54) AUTONOMOUS DRIVING SYSTEM IN HETEROGENEOUS SD MAP AND HD MAP ENVIRONMENT AND MANAGEMENT METHOD FOR THE AUTONOMOUS DRIVING

(71) Applicants: Hyundai Motor Company, Seoul (KR); Kia Corporation, Seoul (KR)

(72) Inventor: Sung Won Yoon, Yongin-Si (KR)

( * ) Notice: Subject to any disclaimer, the term of this patent is extended or adjusted under 35 U.S.C. 154(b) by 197 days.

(21) Appl. No.: 18/242,726

(22) Filed: Sep. 6, 2023

(65) Prior Publication Data

US 2024/0132101 A1  Apr. 25, 2024
US 2024/0227853 A9  Jul. 11, 2024

(30) Foreign Application Priority Data

Oct. 19, 2022  (KR) .................. 10-2022-0134580

(51) Int. Cl.
*B60W 60/00* (2020.01)
*G01C 21/00* (2006.01)
*G01C 21/34* (2006.01)

(52) U.S. Cl.
CPC ..... *B60W 60/0011* (2020.02); *G01C 21/3415* (2013.01); *G01C 21/3492* (2013.01); *G01C 21/387* (2020.08); *B60W 2556/40* (2020.02); *B60W 2556/45* (2020.02)

(58) Field of Classification Search
CPC ......... B60W 60/0011; B60W 2556/40; B60W 2556/45; B60W 60/001; B60W 30/10; B60W 2555/60; B60W 2556/50; G01C 21/3415; G01C 21/3492; G01C 21/387; G01C 21/26; G01C 21/34; G01C 21/3407; G01C 21/30; G01C 21/3461
See application file for complete search history.

(56) References Cited

U.S. PATENT DOCUMENTS

| | | | | |
|---|---|---|---|---|
| 9,910,443 | B1 * | 3/2018 | Lee | B60W 10/06 |
| 2018/0245938 | A1 * | 8/2018 | Song | G01C 21/3492 |
| 2019/0311614 | A1 * | 10/2019 | Yang | G08G 1/052 |
| 2020/0348147 | A1 * | 11/2020 | Maeda | G01C 21/3691 |
| 2021/0180978 | A1 | 6/2021 | Jin et al. | |
| 2021/0215494 | A1 * | 7/2021 | Xia | G01C 21/3691 |
| 2021/0285770 | A1 * | 9/2021 | Lin | G01C 21/3484 |
| 2021/0409379 | A1 * | 12/2021 | Hwang | G08G 1/0112 |

(Continued)

FOREIGN PATENT DOCUMENTS

| | | |
|---|---|---|
| CN | 111309005 A | 6/2020 |
| JP | 2015-102349 A | 6/2015 |

(Continued)

*Primary Examiner* — Anne Marie Antonucci
*Assistant Examiner* — Patrick Daniel Mohl
(74) *Attorney, Agent, or Firm* — Banner & Witcoff, Ltd.

(57) ABSTRACT

An autonomous driving system may be capable of performing autonomous navigation adjustments using different maps. A user may input, on a first map, a departure point and/or a destination point. The autonomous vehicle may be configured to generate a first route using the departure point. The autonomous vehicle may initiate travel along a second route matching the first route using a different map. Based on collecting surrounding information on the second route and/or traffic information on the second route, the autonomous vehicle may be re-routed to travel along a third route.

20 Claims, 6 Drawing Sheets

(56) References Cited

U.S. PATENT DOCUMENTS

2022/0315000 A1* 10/2022 Wray ................. B60W 60/001
2024/0001961 A1* 1/2024 Myung ............. B60W 60/0015

FOREIGN PATENT DOCUMENTS

| JP | 2020-180870 A | 11/2020 |
| KR | 102136213 B1 | 7/2020 |
| KR | 10-2021-0005759 A | 1/2021 |
| KR | 10-2022-0003995 A | 1/2022 |

* cited by examiner

AUTONOMOUS DRIVING SYSTEM IN HETEROGENEOUS SD MAP AND HD MAP ENVIRONMENT AND MANAGEMENT METHOD FOR THE AUTONOMOUS DRIVING

CROSS-REFERENCE TO RELATED APPLICATION

This application claims the benefit of Korean Patent Application No. 10-2022-0134580, filed on Oct. 19, 2022, which is hereby incorporated by reference as if fully set forth herein.

TECHNICAL FIELD

The present disclosure relates to an autonomous driving system in a heterogeneous standard definition (SD) map and high definition (HD) map environment and a method of operating the autonomous driving system.

BACKGROUND

In general, autonomous driving may be performed as a person on board sets a driving route by directly inputting a point of departure (hereafter a departure) and a point of destination (hereafter a destination) to an autonomous vehicle, and the autonomous vehicle drives along the set driving route after determining that it is ready to drive. There may be various methods and means of inputting the departure and the destination. For example, the person on board may touch and select the departure and the destination from a menu provided on an interior panel of the autonomous vehicle, or input text or voice to input the departure and the destination to the autonomous vehicle.

For example, a technology for providing a driving service for an autonomous vehicle may involve a service platform providing a ride-hailing service. If driving the autonomous vehicle using the service platform, a user accesses the service platform and inputs a departure and a destination, and if a driving route is determined according to such input information, the service platform may supervise an operation of the autonomous vehicle.

An autonomous driving system may use a SD map to set a global path with a departure and a destination as a start point (location) and an end point (location), respectively, and then may use a HD map to set a local path for each predetermined section of the global path, thereby completing the process of setting a driving route.

In this case, the global path, which may be generated using the SD map (or SD map information), may be a coarse path along which an autonomous vehicle may travel from a start point to an end point and may be indicated as a road-level path. The local path may refer to a detailed path generated by applying a current location and a moving direction of the vehicle to each section of the global path using the HD map (or HD map information) and may be indicated as a lane-line-level path.

Generally, different maps may define or specify map elements such as roads, lanes, etc. in different properties and/or formats, in other words different content types and/or ways, which may render map data incompatible among heterogeneous maps. In general, maps may be heterogeneous to each other if the map providers or producers are different. Here in after, heterogeneous maps are referred to as the maps map data of which are incompatible to each other due to different properties and/or formats thereof.

If properties and formats are identical between an SD map and an HD map, no problem may occur in matching map information. However, if the producers of the SD map and the HD map are different to each other and thus the maps are produced according to different production standards, the properties and/or formats of the SD map and the HD map may be different. Thus, in the latter case, simply matching the SD map and the HD map may not assure a local path which matches a global path.

In this case, if the developers of the maps share the map sources i.e. the map database (DB) although the developers of the maps are different, it may be possible to match the SD map and the HD map using the shared DB. However, in reality, it may be rare for such different developers to share the DB, and attempts made to match the SD map and the HD map in this way may be of no avail.

The properties of a map may include, for example, Link/Node shape information (including coordinate system information), Link/Node identification (ID) information (primary key), road class (general, express, city express, etc.) information, road type (interchange/junction (IC/JC), intersection, main line non-separation, etc.) information, Link traffic information (traffic vehicle type, time-varying regulations, etc.), maximum speed limit information, Link additional information (central bus-only lanes, curbside bus-only lanes, etc.), car-only road information, U-turn point information, bus-related time-varying regulation information, speed camera information, and/or protection area information.

Another method of resolving the incomparability between a SD map and a HD map due to different properties without sharing the DB may be providing an appropriate matching table by comparing the internal properties of the SD map and the HD map. However, the composition of a map belongs to intellectual property, and this method may also use technical and legal agreements between developers.

Inside an autonomous vehicle, a SD map used to generate a global path and a HD map used to generate a local path may both be embedded, and the developers of these maps may be the same. Thus, matching the SD map and the HD map may not be a problem. For the convenience of description, a SD map that matches a HD map is defined herein as a matching-based SD map, and a SD map that does not match the HD map is literally described herein as a SD map.

In addition, for an autonomous vehicle that is to travel along a route configured based on heterogeneous map matching in an autonomous driving system, if the autonomous driving system determines that autonomous driving is not available while following an existing route, for example, if the autonomous vehicle is stopped or if the vehicle is not able to enter a lane due to an accident, a construction, or the like, it may generate a new route that bypasses the existing route.

SUMMARY

According to the present disclosure, a system for a vehicle may comprise: at least one processor; and a memory storing instructions that, when executed by the at least one processor, cause the system to perform: receiving, based on an input of a user and a first map, a departure location and a destination location; based on a second map, the departure location, and the destination location, generating a first route associated with a global path; based on a third map, generating a second route, associated with a local path, matching the first route; and based on: surrounding information obtained by at least one sensor of the vehicle while the vehicle is on the second route; and traffic information, associated with the second route, provided via a wireless communication network, generating a third route.

The generating the third route may comprise generating, based on object information, associated with the third map, that allows the vehicle to deviate from the second route. The generating the third route may further comprise: generating detour information; and generating, based on the detour information, the third route. The detour information may comprise road information associated with the second map that matches the object information.

The system for the vehicle, wherein properties associated with the first map may be unmatched by properties associated with the third map. The system for the vehicle, wherein properties associated with the second map may match properties associated with the third map. The second route or the third route may comprise turn-by-turn (TBT) information between the departure location and the destination location, wherein the TBT information may include at least one of directions: going straight; turning left; turning right; or making a U-turn.

The instructions, when executed by the at least one processor, may further cause the system to transmit, to a service platform via the wireless communication network, at least one of: a current location of the vehicle; a duration of time to reach the destination location; turn-by-turn information; or the detour information.

According the present disclosure, a system may comprise a service platform configured to: receive, based on an input of a user and based on a first map, a departure location and a destination location; and provide, based on information received from a vehicle and the first map, to the user, at least one of: a current location of a vehicle; a duration of time to reach the destination location; turn-by-turn information; or detour information; and the vehicle comprising at least one processor and a memory storing instructions that, when executed by the at least one processor, cause the vehicle to perform: receiving, based on the input of the user and the first map, the departure location and the destination location; based on a second map, the departure location, and the destination location, generating a first route associated with a global path; based on a third map, generating a second route, associated with a local path, matching the first route; and based on: surrounding information obtained by at least one sensor of the vehicle while the vehicle is on the second route; and traffic information, associated with the second route, provided via a wireless communication network, generating a third route.

The service platform may be further configured to: transmit, to the vehicle and based on the input of the user via the first map, the departure location and the destination location; or transmit, to the vehicle and based on a fourth map received from an external navigation device to the user, the departure location, the destination location, and turn-by-turn information.

According the present disclosure, a method for a vehicle, the method may comprise: receiving, based on an input of a user and a first map provided by a service platform, a departure location and a destination location; based on a second map, the departure location, and the destination location, generating a first route; based on a third map, generating a second route, associated with a local path, matching the first route; and based on: surrounding information obtained by at least one sensor of the vehicle while the vehicle is on the second route; and traffic information, associated with the second route, provided via a wireless communication network, generating a third route.

The generating the third route may comprise generating, based on object information, associated with the third map, that allows the vehicle to deviate from the second route. The generating the third route may further comprise: generating detour information; and generating, based on the detour information, the third route.

The detour information may comprise road information associated with the second map that matches the object information. The first route may comprise turn-by-turn (TBT) information between the departure location and the destination location, and format associated with the first map is unmatched by format associated with the third map, wherein the TBT information includes at least one of directions: going straight; turning left; turning right; or making a U-turn.

The method for the vehicle, wherein properties associated with the second map may match properties associated with the third map. The method for the vehicle may further comprise: transmitting, to the service platform via the wireless communication network, at least one of: a current location of the vehicle; a duration of time to reach the destination location; turn-by-turn (TBT) information; or the detour information.

The method for the vehicle may further comprise: causing the service platform, based on the first map, to provide, to the user, the at least one of: the current location of the vehicle; the duration of time to reach the destination location; the TBT information; or the detour information.

The second route or the third route may comprise turn-by-turn information between the departure location and the destination location. The method for the vehicle, may further comprise: providing an interface for the user, based on the first map provided by the service platform via an application, to input the departure location and the destination location; or providing an interface for the user, based on a fourth map, to input the departure location and the destination location, wherein the fourth map is received from an external navigation device and provided by the service platform to the user.

Additional advantages, objects, and features of the present disclosure will be set forth in part in the description which follows and in part will become apparent to those having ordinary skill in the art upon examination of the following or may be learned from practice of the invention. The objects and other advantages of the invention may be realized and attained by the structure particularly pointed out in the written description and claims hereof as well as the appended drawings.

DETAILED DESCRIPTION

Figure 1:
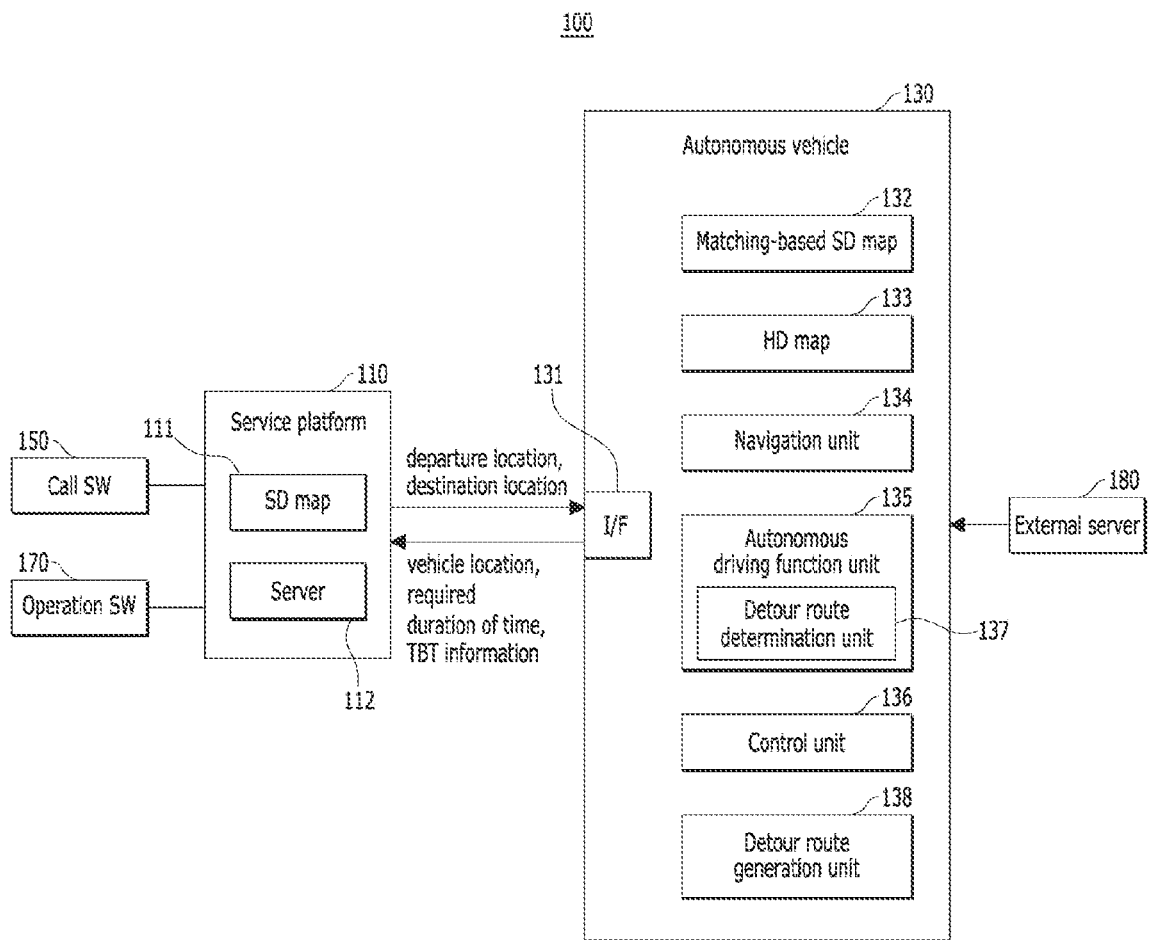
FIG. 1 shows an example of a service system for autonomous driving in a heterogeneous SD/HD map environment.

To fully understand the operational effects and the objects to be achieved by example examples of the present disclosure, reference should be made to the accompanying drawings showing the examples of the present disclosure and the contents described in the accompanying drawings.

Hereinafter, example examples of the present disclosure will be described in detail with reference to the accompanying drawings, and the same or similar elements will be given the same reference numerals regardless of reference symbols, and a redundant description thereof will be omitted.

FIG. 1 shows an example of a service system for autonomous driving in a heterogeneous SD/HD map environment.

Referring to FIG. 1, a service system 100 in a heterogeneous SD/HD map environment according to an example may include a service platform 110 and an autonomous vehicle 130.

The service platform 110 may include a first map 111 and a server 112. The first map 111 may be a general-purpose map which does not match a third map 133 included in the autonomous vehicle 130 to be described later. The first map 111 may also be referred to as a SD map 111, and the third map 133 may also be referred to as a HD map 133. For example, the SD map 111 may be a heterogeneous SD map having different properties and/or formats from those of the HD map 133, and may be stored in the service platform 110, including information with which a user inputs a departure point (location) and a destination point (location).

There may be various operators of the service platform 110, and thus the properties and/or formats of the SD map 111 may also vary depending on the service platform 110.

The server 112 may provide a means, e.g. a user interface, for inputting a departure point and a destination point to the user who desires to use the autonomous vehicle 130 using information of the SD map 111, and transmit the departure point and the destination point input from the user to the autonomous vehicle 130.

The server 112 may reproduce driving information received from the autonomous vehicle 130 as it is or after processing it, as a means, e.g. a visual display, recognizable by the user.

For example, the service platform 110 may include a service platform providing a ride-hailing service.

Call software (SW) 150 may be a means through which the user may subscribe to the service platform 110 or access the service platform 110 to input the departure point and the destination point and monitor an actual driving state of the autonomous vehicle 130. The call SW may be downloaded from the service platform 110 to a user's terminal and installed therein. Additionally or alternatively, the call SW may be installed in the service platform 110 such that the user may access to and operate the SW through the Internet by the user's terminal.

Operation SW 170 may provide a route up to the destination point to an emergency driver on board the autonomous vehicle 130 or a remote operator who controls an operation of the autonomous vehicle 130 from the outside of the autonomous vehicle 130, or identify and/or process passengers getting on and off the autonomous vehicle 130, after the access to the service platform 110.

The call SW 150 and the operation SW 170 may be implemented in the form of an SW application. It is also possible to implement these by hardware implemented as an active element and/or a passive element, for example, a mobile terminal or a smart device, in which the call SW 150 and the operation SW 170 may be provided in the form of an application.

The autonomous vehicle 130 may include an interface (I/F) 131, a memory storing a second map 132 which matches the HD map 133 in terms of properties and thus may be compatible with the HD map 133, a memory storing the third map 133, a navigation unit 134, an autonomous driving function unit 135, a control unit 136, and a detour route generation unit 138. The second map 132 may also be referred to herein as a matching-based SD map 132.

The autonomous vehicle 130 may generate a first route and generate a second route matching the first route, using the second map 132 and the third map 133. The first route may also be referred to herein as a global path, and the second route may also be referred to herein as a local path.

Under the control of the control unit 136, the autonomous vehicle 130 may generate the first route and generate the second route matching the first route, using the departure point and the destination point received from the service platform 110 via the interface (I/F) 131, the matching-based SD map 132, and the HD map 133, according to a prestored program.

In addition, the autonomous vehicle 130 may generate turn-by-turn (TBT) information including driving direction change information in the local path and include the generated TBT information in the local path. For example, the driving direction change information may include TBT information for changing a direction in which the vehicle moves or travels on a road in a case of, for example, going straight, turning left, turning right, or making a U-turn.

The navigation unit 134 may search for the global path, the local path, and a third route to be described later, based on the matching-based SD map 132 matching the HD map 133 such as, for example, an AutoEver local personal computer (PC) navigator and Bluelink, or the like.

If ready to drive, the autonomous vehicle 130 may control the autonomous driving function unit 135 to operate along the set local path or the third route to be described later, and may transmit, to the service platform 110, the driving direction change information, a current location, a time to reach the destination point, and the TBT information during the driving, of the autonomous vehicle 130.

The autonomous driving function unit 135 may include a detour route determination unit 137 configured to receive various information associated with a detour route and determine whether to generate the detour route based on the provided information.

The detour route determination unit 137 may receive surrounding information on the second route from the control unit 136 and traffic information on the second route from an external server 180, and determine whether to generate the third route by collecting the provided surrounding information and the provided traffic information. The third route may also be referred to herein as a detour route.

For example, if it is determined that there is a need to generate the third route, the detour route determination unit 137 may use object information in the HD map 133 that may deviate from the local path which is an existing route. That is, if it is determined that there is a cause to generate the detour route, the detour route determination unit 137 may use, from the HD map 133, the object information that may allow the autonomous vehicle 130 to drive away from the local path along which the autonomous vehicle 130 is currently driving. The object information or the object information in the HD map may include a specific road object (e.g., Roadlink ID).

If it is determined that there is a cause to generate the detour route, the detour route determination unit 137 may select a specific road object (e.g., Roadlink ID) in the HD map 133. In this case, there may be at least one specific road object (e.g., Roadlink ID).

The third route, which is the detour route, may be defined as a new driving route that is set between the road object and the existing destination point after the autonomous vehicle 130 moves toward the road object from the current location. The road object may also be referred to herein as a selected specific road object.

If the specific road object, which is the object information in the HD map 133, is used by the detour route determination unit 137, the autonomous vehicle 130 may generate detour information and set the detour route based on the generated detour information.

If ready to drive along the set detour route, the autonomous vehicle 130 may control the autonomous driving function unit 135 to drive or autonomously drive along the set detour route.

The detour route generation unit 138 may analyze the detour information and set the detour route corresponding to a result value obtained from the analyzed detour information, under the control of the control unit 136. The detour route generation unit 138 may set the detour route, which may be a new route, by generating the detour information and adding the generated detour information to the global path or the local path which may be an existing route.

The detour information may include a road object (e.g., a SD map link ID, or specific coordinates in the SD map or a set of the coordinates) of the SD map that matches the specific road object (e.g., Roadlink ID).

That is, the detour route generation unit 138 may add the generated detour information to the global path or the local path to generate or regenerate the detour route that is a new route leading to a "vehicle location, "detour information," and "destination."

In addition, if ready to drive, the autonomous vehicle 130 may control the autonomous driving function unit 135 to operate along the set detour route, and transmit, to the service platform 110, the driving direction change information, the current location, the time to reach the destination point, and the TBT information during the driving, of the autonomous vehicle 130.

Figure 2:
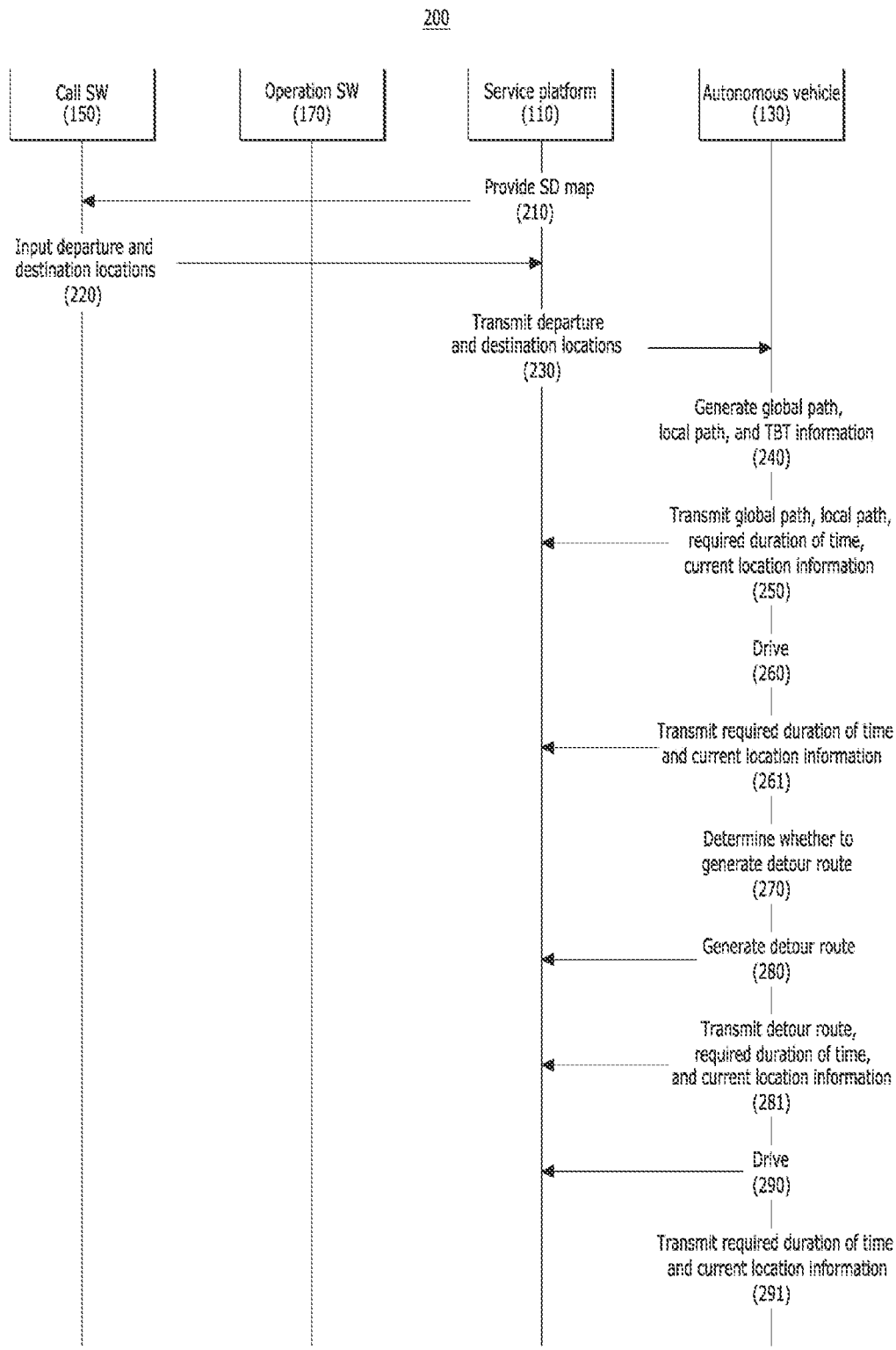
FIG. 2 shows an example of a method of operating the autonomous driving system in a heterogeneous SD/HD map environment shown in FIG. 1.

FIG. 2 shows an example of a method of operating the autonomous driving system in a heterogeneous SD/HD map environment illustrated in FIG. 1.

Referring to FIG. 2, the method may include: step 210 in which, if a user accesses the service platform 110 through the call SW 150, the service platform 110 may provide the SD map 111 that does not match the HD map 133 included in the autonomous vehicle 130 to the user through the call SW 150; step 220 in which the user or driver may input a departure point and a destination point using SD map information provided by the service platform 110 using the call SW 150; step 230 in which the service platform 110 may transmit the departure point and the destination point input from the user to the autonomous vehicle 130; step 240 in which the autonomous vehicle 130 may generate a global path and a local path matching the global path, using the departure point and the destination point received from the service platform 110 and the matching-based SD map 132 and the HD map 133 stored therein; and step 260 in which the autonomous vehicle 130 may drive along the local path.

The method may include step 250 in which the autonomous vehicle 130 may transmit, to the service platform 110, the generated global path or the generated local road, a time to reach the destination point, and current location information of the autonomous vehicle 130.

The driving step 260 may include step 261 in which the autonomous vehicle 130 may transmit, to the service platform 110, the current location information of the autonomous vehicle 130 (or vehicle location), the time to reach the destination point (e.g., or required time), and TBT information. Specifically, the autonomous vehicle 130 may generate the TBT information including driving direction change information on a specific road included in the local path and include the generated TBT information in the local path.

The driving step 260 may include step 270 in which the autonomous vehicle 130 may determine whether to generate a detour route by collecting surrounding information on the local path and traffic information on a second route provided from the external server 180, while driving along the local path; and step 280 in which the autonomous vehicle 130 may generate the detour route corresponding to a result value obtained by the determining.

In addition, the driving step 260 may include step 281 in which the autonomous vehicle 130 may transmit, to the service platform 110, the generated detour route, the time to reach the destination point, and the current vehicle location information.

In addition, step 290 of driving along the detour route may include step 291 in which the autonomous vehicle 130 transmits, to the service platform 110, the current vehicle location information, the time to reach the destination point, and the TBT information of the autonomous vehicle 130. Specifically, the autonomous vehicle 130 may generate the TBT information including the driving direction change information on a specific road included in the detour route and include the generated TBT information in the detour route.

In the examples shown in FIGS. 1 and 2, the autonomous vehicle 130 may generate the global path using the received departure and destination points, and then, for generating the local path using the global path, may set the TBT information on the local path according to a preset program.

In addition, while driving along the generated local path, the autonomous vehicle 130 may determine whether to generate the detour route by collecting surrounding information on the local path and traffic information on the second route provided from the external server 180, and generate the detour route corresponding to a result value obtained by the determining. For generating the detour route, the autonomous vehicle 130 may arbitrarily set the TBT information on the detour route according to the preset program.

A method of inputting the departure point and the destination point by the user may be implemented in various ways, for example, by touching a corresponding area on a touchscreen or outputting the area in voice.

In the examples shown in FIGS. 1 and 2, the service platform 110 may simply perform a function of transmitting the SD map 111 stored in the service platform 110 to the user, and a function of transmitting the departure point and the destination point input by the user to the autonomous vehicle 130. However, according to another example to be described below, the service platform 110 may allow a SD map provided by a navigation device separate from the service platform 110, instead of the SD map 111 stored in the service platform 110 itself, to be available.

Figure 3:
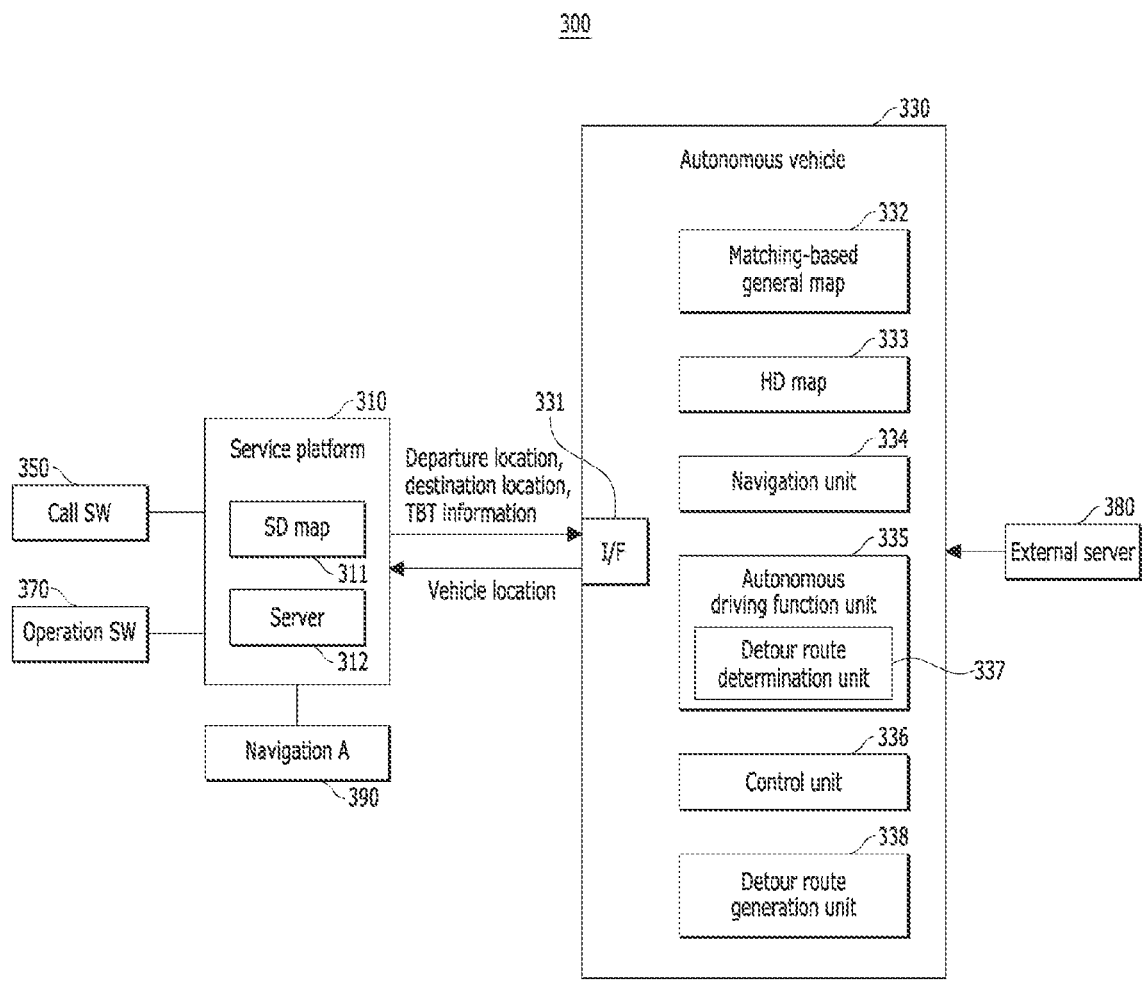
FIG. 3 shows another example of a service system for autonomous driving in a heterogeneous SD/HD map environment.

FIG. 3 shows another example of an autonomous driving system in a heterogeneous SD/HD map environment.

Referring to FIG. 3, an autonomous driving system 300 in a heterogeneous SD/HD map environment according to an example may include a service platform 310 and an autonomous vehicle 330.

Respective functions of the service platform 310, the autonomous vehicle 330, call SW 350, and operation SW 370 shown in FIG. 3 are almost the same as those of the service platform 110, the autonomous vehicle 130, the call SW 150, and the operation SW 170 described above with reference to FIG. 1, and thus only a difference therebetween will be described below.

The service platform 110 shown in FIG. 1 may provide, to the user, the SD map 111 that does not match the HD map 133 provided in the autonomous vehicle 130 but allows the user to select a departure point and a destination point therefrom. In contrast, the service platform 310 shown in FIG. 3 may provide, to a user, a SD map (not shown) provided by a navigation device A 390, instead of a SD map 311 stored in the service platform 310, by a server 312 of the service platform 310, and may thereby allow the navigation device A 390 to generate TBT information according to a preset program if the user inputs a departure point and a destination point using the call SW 350.

The service platform 310 may transmit, to the autonomous vehicle 330, the TBT information generated by the navigation device A 390 and the departure point and the destination point input from the user.

The navigation device A 390 may transmit, to the call SW 350 or the operation SW 370, time (e.g., required time) information according to the departure point and the destination point input from the user.

The autonomous vehicle 330 may generate a global path using the departure point and the destination point, and the TBT information, which may be received from the service platform 310, and generate a local path using the generated global path.

In addition, if ready to drive, the autonomous vehicle 330 may control an autonomous driving function unit 335 to operate along the set local path or detour route, and transmit, to the service platform 110, driving direction change information, a current location, a time (e.g., required time) to reach the destination point, and the TBT information during the driving, of the autonomous vehicle 330.

The autonomous driving function unit 335 may include a detour route determination unit 337 configured to receive various information associated with a detour route and determine whether to generate the detour route based on the provided information.

The detour route determination unit 337 may receive surrounding information on a second route from a control unit 336 and traffic information on the second route from an external server 380, and determine whether to generate a third route by collecting the provided surrounding information and the provided traffic information. The third route may also be referred to herein as a detour route.

For example, if it is determined that there is a cause to generate the third route, the detour route determination unit 337 may use object information in a HD map that may deviate from the local path which may be an existing route. That is, if it is determined that there is a cause to generate the detour route, the detour route determination unit 337 may use, from the HD map, object information that may allow the autonomous vehicle 330 to drive away from the local path along which the autonomous vehicle 330 may be currently driving. The object information or the object information in the HD map may include a specific road object (e.g., Roadlink ID).

If it is determined that there is a cause to generate the detour route, the detour route determination unit 337 may select a specific road object (e.g., Roadlink ID) in the HD map to proceed (or deviate). In this case, there may be at least one specific road object (e.g., Roadlink ID).

The third route, which is the detour route, may be defined as a new driving route that is set between a corresponding road object and the existing destination point after the autonomous vehicle 330 may move toward the road object from the current location. The road object may also be referred to herein as a selected specific road object.

If the specific road object, which is the object information in the HD map, is used by the detour route determination unit 337, the autonomous vehicle 330 may generate detour information and set the detour route based on the generated detour information.

If ready to drive along the set detour route, the autonomous vehicle 330 may control the autonomous driving function unit 335 to drive or autonomously drive along the set detour route.

A detour route generation unit 338 may analyze the detour information under the control of the control unit 336, and set the detour route corresponding to a result value obtained by analyzing the detour information. The detour route generation unit 338 may set the detour route, which is a new route, by generating the detour information and adding the generated detour information to the global path or local path which is an existing route.

The detour information may include a road object (e.g., a SD map link ID, or specific coordinates in the SD map or a set of the coordinates) of the SD map matching the specific road object (e.g., Roadlink ID).

That is, the detour route generation unit 338 may add the generated detour information to the global path or the local path to generate or regenerate the detour route which may be a new route leading to the "vehicle location," the "detour information," and the "destination point."

In addition, if ready to drive, the autonomous vehicle 330 may control the autonomous driving function unit 335 to operate along the set detour route, and transmit, to the service platform 310, the driving direction change information, the current location, the time (e.g., required time) to reach the destination point, and the TBT information during the driving, of the autonomous vehicle 330.

Figure 4:
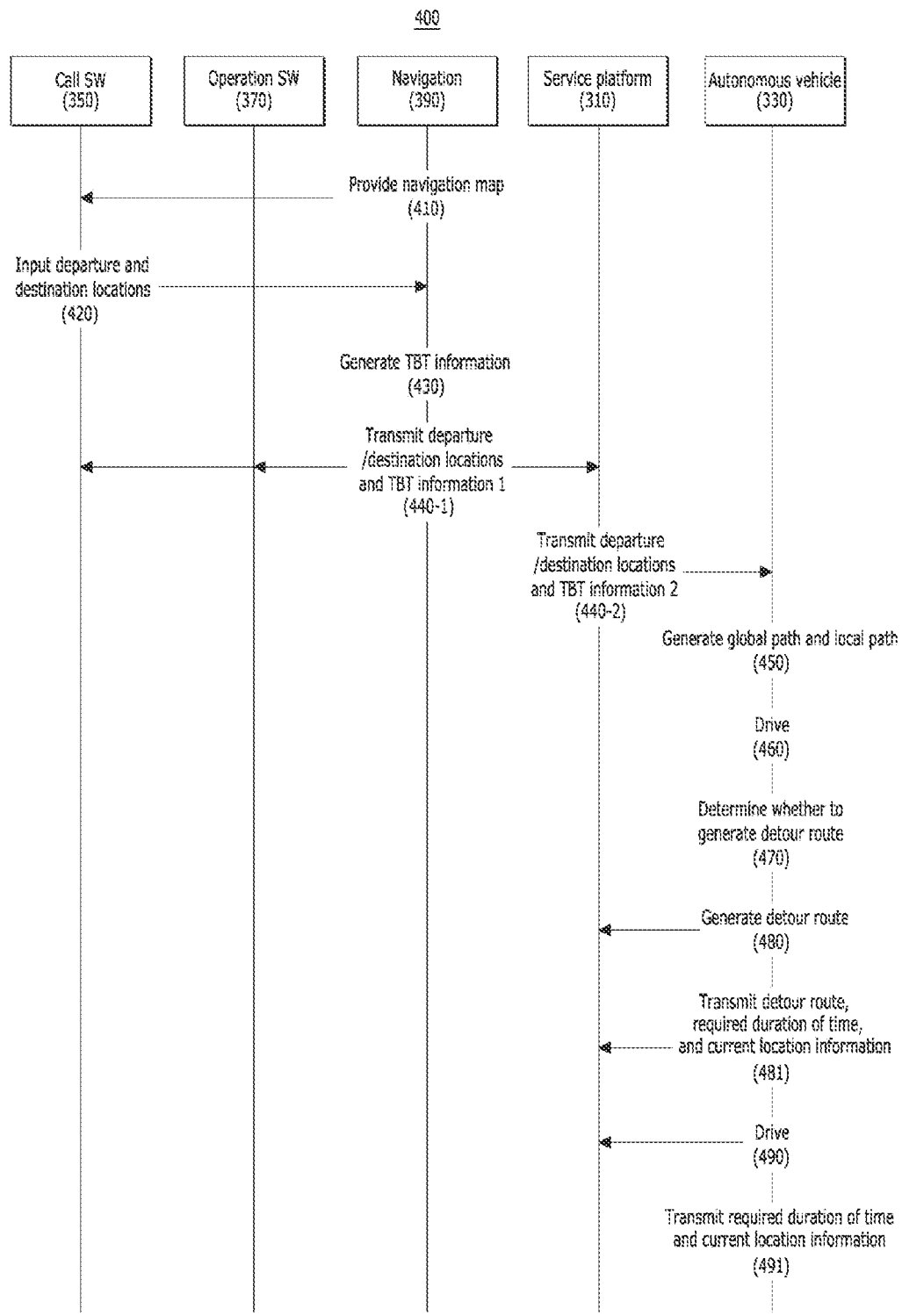
FIG. 4 shows an example of a method of operating the autonomous driving in a heterogeneous SD/HD map environment shown in FIG. 3.

FIG. 4 shows an example of a method of operating the autonomous driving system in a heterogeneous SD/HD map environment illustrated in FIG. 3.

Referring to FIG. 4, the method may include: step 410 in which, if a user accesses the service platform 310 through the call SW 350, the service platform 310 may provide, to the user through the call SW 350, a SD map that does not match a HD map 333 using the navigation device A 390; step 420 in which the user may input a departure point and a destination point using the SD map provided by the navigation device A 390 through the call SW 350; step 430 in which the navigation device A 390 may generate TBT information using the departure point and the destination point input by the user; step 440-1 in which the navigation device A 390 may transmit the departure point, the destination point, and the TBT information to the service platform 310; step 440-2 in which the service platform 310 may transmit, to the autonomous vehicle 330, the departure point, the destination point, and the TBT information received from the navigation device A 390; step 450 in which the autonomous vehicle 330 may generate a global path using the departure point, the destination point, and the TBT information received from the service platform 310, and a matching-based SD map 332 stored inside, and may generate a local path matching the global path using the HD map 133; and step 460 in which the autonomous vehicle 330 may drive along the local path.

The driving step 460 may include step 461 in which the autonomous vehicle 330 may transmit, to the service platform 310, current location information (vehicle location) of the autonomous vehicle 330, a time (e.g., required time) to reach the destination point, and the TBT information. Specifically, the autonomous vehicle 330 may generate the TBT information including driving direction change information on a specific road included in the local path and include the generated TBT information in the local path.

The driving step 460 may include step 470 in which the autonomous vehicle 330 may determine whether to generate a detour route by collecting surrounding information on the local path and traffic information on a second route provided from the external server 380 while driving along the local path, and step 480 in which the autonomous vehicle 330 may generate the detour route corresponding to a result value obtained by the determining.

The driving step 460 may include step 481 in which the autonomous vehicle 330 may transmit the generated detour route, the time (e.g., required time) to reach the destination point, and the current vehicle location information to the service platform 310.

Step 490 of driving along the detour route may include step 491 in which the autonomous vehicle 330 may transmit the current location information (vehicle location) of the autonomous vehicle 330, the time (e.g., required time) to reach the destination point, and the TBT information to the service platform 310. Specifically, the autonomous vehicle 330 may generate the TBT information including the driving direction change information on a specific road included in the detour route and include the generated TBT information in the detour route.

In the examples shown in FIGS. 1 and 2, for generating a global path or a local path using a departure point and a destination point, the autonomous vehicle 330 may randomly generate TBT information.

In contrast, in the examples shown in FIGS. 3 and 4, for generating a global path and a local path using the matching-based SD map 332 and the HD map 333, the autonomous vehicle 330 may reflect TBT information generated in the navigation device A 390, which is different from the examples described above with reference to FIGS. 1 and 2.

The navigation device A 390 shown in FIGS. 3 and 4 may include "Naver" map information service, T map, or the like.

According to examples of the present disclosure, a navigation device (e.g., the navigation device A 390) separate from a service platform, or an autonomous vehicle, may be allowed to generate a global path or a local path from a departure point to a destination point, or TBT information included in a detour route, and the autonomous vehicle may generate a final global path, a final local path, or a detour route. It is thus possible to generate the global path, the local path, and the detour route even if the properties and/or formats of a SD map used for a user to input the departure point and the destination point do not match those of a HD map embedded in the autonomous vehicle.

In the above described examples, the vehicle may comprises a autonomous driving system which comprises at least one processor (e.g. computer, microprocessor, CPU, ASIC, circuitry, logic circuits, etc.) and a non-transitory computer-readable storage medium (e.g. a hard disk drive (HDD), a solid-state drive (SSD), a silicon disk drive (SDD), a ROM, a RAM, a CD-ROM, a magnetic tape, a floppy disk, an optical data storage device, etc.) storing instructions which cause, by being executed by the at least one processor, the at least one processor to perform the above described functionalities of the autonomous vehicle.

The service systems 100 and the autonomous driving system 300 shown in FIGS. 1 and 3 may be differentiated from each other according to whether the service platform 110 or 310 uses the navigation device A 390, and it is common to implement and use each as a separate system. If the systems are provided separately, a user may or may not directly input TBT information depending on a system to be used.

However, as will be described below, if there is a service system which is made by combining the systems shown in FIGS. 1 and 3, it is possible to change a method of operating a service platform and an autonomous vehicle depending on a situation.

Figure 5A:
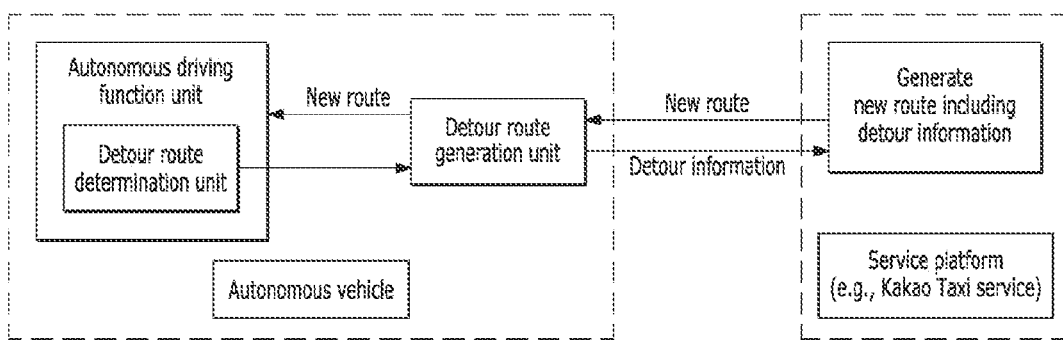
FIG. 5A and FIG. 5B show another example of a method of operating an autonomous driving in a heterogeneous SD/HD map environment.
Figure 5B:
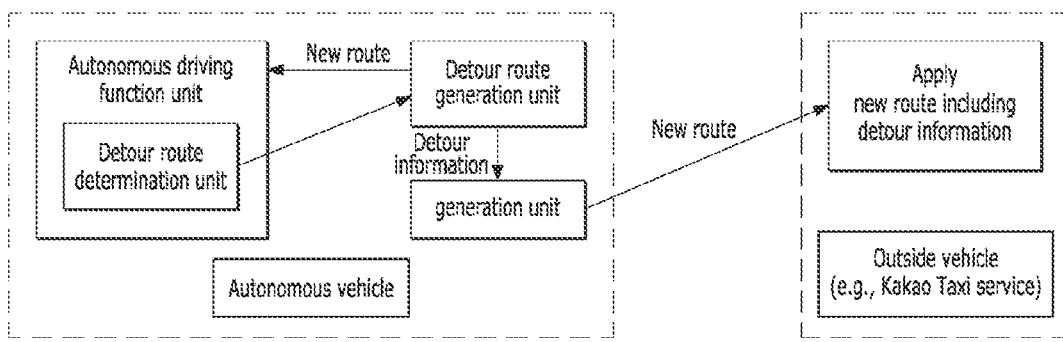

FIG. 5A and FIG. 5B show another example of a method of operating an autonomous driving system in a heterogeneous SD/HD map environment.

A method of operating an autonomous driving system in a heterogeneous SD/HD map environment according to an example will be described hereinafter with reference to FIG. 5A and FIG. 5B.

As shown in FIG. 5A, a service platform may generate a detour route under the control of a server.

The service platform may generate the detour route as a single coordinate point or generate TBT information including at least one coordinate point.

The service platform may generate the detour route through one coordinate point under the control of the server.

Under the control of the server, the service platform may indicate or select a location to deviate from a global path or a local path along which an autonomous vehicle is driving, as one coordinate as a type of waypoint. The one coordinate may be new route information.

The service platform may transmit the new route information to the autonomous vehicle under the control of the server.

If the new route information is transmitted, an autonomous driving function unit of the autonomous vehicle may determine whether to generate the detour route through a detour route determination unit. For example, the detour route determination unit may determine a target roadlink ID to deviate, based on the new route information using the HD map.

If the roadlink ID determined by the detour route determination unit is provided, a detour route generation unit may provide, to the service platform, detour information in which a coordinate currently closest to the autonomous vehicle may be selected from geometry information of the corresponding roadlink ID.

The detour information may include a current location of the autonomous vehicle, the selected single point coordinate, or the like.

If the detour information is provided, the service platform may generate the detour route, which may be a new driving route, that connects the location of the vehicle, the selected single point coordinate, and the destination point, based on the detour information under the control of the server.

Unlike this, the service platform may generate the detour route through TBT information under the control of the server.

Under the control of the server, the service platform may indicate or select, as the TBT information, a location to which the autonomous vehicle may deviate from the global path or the local path along which the autonomous vehicle is driving.

The TBT information may be indicated as a plurality of coordinate pairs by grouping at least one coordinate or point representing a route as a main point. It may also be referred to as new route information.

The service platform may transmit the new route information, which is the TBT information, to the autonomous vehicle under the control of the server.

If the new route information is transmitted, the autonomous driving function unit of the autonomous vehicle may determine whether to generate the detour route through the detour route determination unit. For example, the detour route determination unit may determine the target roadlink ID to deviate based on the new route information using the HD map. If the target roadlink ID determined by the detour route determination unit is provided, the detour route generation unit may provide, to the service platform, the detour information generated as the TBT information with a portion or entirety of geometry information of the corresponding roadlink ID.

The detour information may include a current location of the autonomous vehicle, the generated TBT coordinate set, or the like.

If the detour information is provided, the service platform may generate the detour route, a new driving route that connects the location of the vehicle, the generated TBT coordinate set, and the destination point, based on the detour information under the control of the server.

As shown in FIG. 5B, the autonomous vehicle may generate a detour route.

Since a HD map and a SD map are matched in the autonomous vehicle, the detour route determination unit of the autonomous vehicle may determine a target roadlink ID to deviate from a global path or local path, which may be an existing route, based on the HD map under the control of the autonomous driving function unit.

For example, the detour route determination unit may detect its own SD map link ID that matches the target roadlink ID to deviate from the global path or the local path which may be the existing route.

If the detected SD map link ID matching the target roadlink ID is provided by the detour route determination unit using a navigation device embedded in the autonomous vehicle, the detour route generation unit may generate the detour route, which may be a new driving route, that connects the location of the vehicle, the generated SD map link ID, and the destination point.

The detour route generation unit may generate TBT information for the entire detour route, which may be the newly generated driving route, under the control of the control unit, and transmit the generated TBT information to the service platform through an interface.

If the detour route, which may be the new route including the generated TBT information, is transmitted, the service platform may apply transmitted detour route-related information under the control of the server to a necessary subsystem such as an app.

The detour information exchanged between heterogeneous map systems, which is described above, may include coordinates, a coordinate set, route TBT, or the like, which may use a standardized earth coordinate representation method such as latitude/longitude, ENU, MM8, and the like.

Figure 6A:
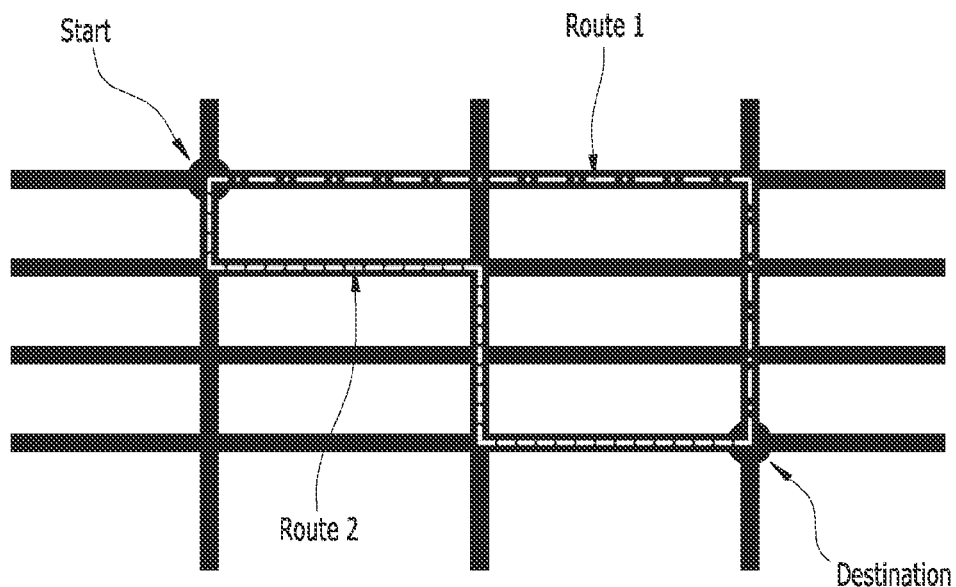
FIG. 6A and FIG. 6B show examples of driving direction change information.
Figure 6B:
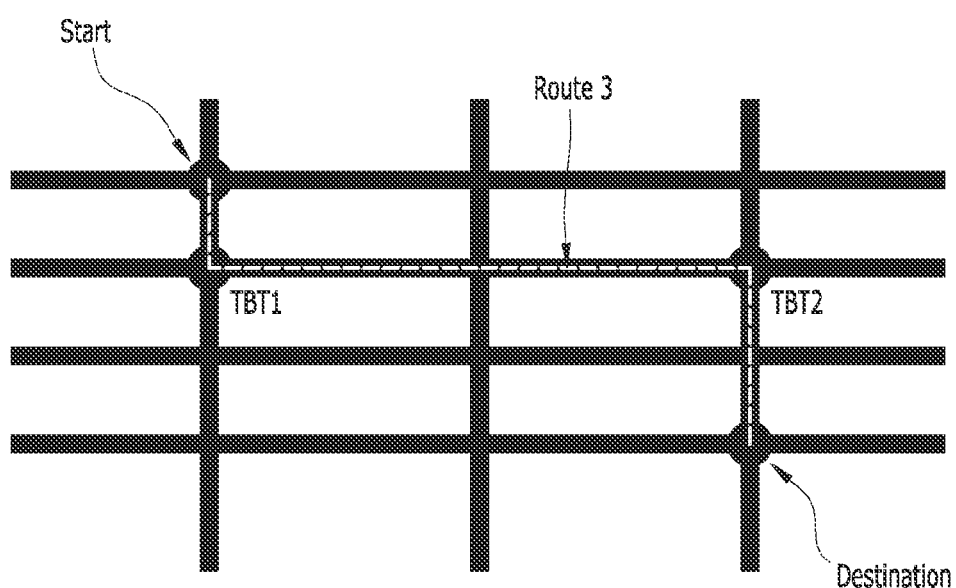

FIG. 6A and FIG. 6B show examples of driving direction change information.

FIG. 6A shows an example of a detour route generated using a departure point and a destination point input by a user, and FIG. 6B shows an example of a detour route generated using TBT information (e.g., TBT) generated by a navigation device A in addition to the departure point and destination point.

Referring to FIG. 6A, since an autonomous vehicle generates a detour route using, for example, only a departure point (or "start" as illustrated) and a destination point (or "destination" as illustrated), it may be verified that the generated detour route is indicated as multiple ones (route 1 indicated by a dotted line, and route 2 indicated by an alternated long and short dash line), not a single one.

Referring to FIG. 6B, since the autonomous vehicle generates a detour route using TBT information (TBT1, TBT2) generated by a navigation device A in addition to a departure point and a destination point, it may be verified that the generated detour route is set as a single route in which the TBT information (TBT1, TBT2) is reflected therein.

Various examples of the present disclosure are directed to providing an autonomous driving system that, if there is a need to generate a detour route in a heterogeneous SD/HD map environment while keeping an autonomous driving system, generates the detour route and operates an autonomous driving service using the generated detour route.

According to an example of the present disclosure, there is provided an autonomous driving system in a heterogeneous SD/HD map environment, the autonomous driving system including a service platform configured to transmit, to an autonomous vehicle, a departure point and a destination point input from a user by use of a first map, and the autonomous vehicle configured to generate a first route using the departure point, the destination point, and a second map stored therein, and generate a second route matching the first route using a third map stored therein, according to a preset program, wherein the autonomous vehicle is configured to determine whether to generate a third route by collecting surrounding information on the second route and traffic information on the second route provided from an external server, during autonomous driving along the second route, and set the third route corresponding to a determined result value obtained by the determining.

An autonomous driving system for a vehicle, according to an example of the present disclosure, comprises at least one processor; and a non-transitory computer-readable storage medium storing instructions which cause, by being executed by the at least one processor, the at least one processor to perform receiving a departure location and a destination location input by a user by use of a first map, generating a first route of a global path by use of a second map based on the departure location and the destination location, and a second route of a local path matching the first route by use of a third map, and generating a third route based on surrounding information obtained by at least one or more sensors of the vehicle while the vehicle is progressing on the second route and traffic information on the second route provided through a wireless communication network.

In at least one example of the present disclosure, the generating the third route comprises using, from the third map, object information that allows the vehicle to deviate from the second route.

In at least one example of the present disclosure, the generating the third route further comprises generating detour information, and generating the third route based on the detour information.

In at least one example of the present disclosure, the detour information comprises road information of the second map that matches the object information.

In at least one example of the present disclosure, the first map is unmatched by the third map in map data format.

In at least one example of the present disclosure, the second map matches the third map in map data format.

In at least one example of the present disclosure, the second route or the third route comprises turn-by-turn (TBT) information between the departure location and the destination location.

In at least one example of the present disclosure, the at least one processor is further caused by the instructions to transmit at least one of a current location of the vehicle, a duration of time to reach the destination location, TBT information, or the detour information to a service platform through the wireless communication network.

A service system, according to an example of the present disclosure, comprises a service platform configured to receive a departure location and a destination location input by a user by use of a first map, and a vehicle comprising at least one processor and a non-transitory computer-readable storage medium storing instructions which cause, by being executed by the at least one processor, the at least one processor to perform receiving a departure location and a destination location input by a user by use of a first map, generating a first route of a global path by use of a second map based on the departure location and the destination location, and a second route of a local path matching the first route by use of a third map, and generating a third route based on surrounding information obtained by at least one or more sensors of the vehicle while the vehicle is progressing on the second route and traffic information on the second route provided through a wireless communication network, wherein the service platform is further configured to provide, to the user, the at least one of a current location of the vehicle, a duration of time to reach the destination location, TBT information, or detour information received from the vehicle according to the first map.

In at least one example of the service system, the service platform is further configured to transmit, to the autonomous vehicle, the departure location and the destination location input by the user through the first map, or transmit, to the vehicle, the departure location, the destination location, and TBT information generated by use of a fourth map which is received from an external navigation device and provided to the user.

A method of autonomous driving for a vehicle in a heterogeneous standard definition (SD) map and high definition (HD) map environment, according to an example of the present disclosure, comprises receiving a departure location and a destination location input by a user by use of a first map provided by a service platform, generating a first route of a global path by use of a second map based on the departure location t, the destination location, and a second route of a local path matching the first route by use of a third map, and generating a third route based on surrounding information obtained by at least one or more sensors of the vehicle while the vehicle is progressing on the second route and traffic information on the second route provided through a wireless communication network.

In at least one example of the method, the generating the third route comprises using, from the third map, object information that allows the vehicle to deviate from the second route.

In at least one example of the method, the generating the third route further comprises generating detour information, and generating the third route based on the detour information.

In at least one example of the method, the detour information comprises road information of the second map that matches the object information.

In at least one example of the method, the first route comprises turn-by-turn (TBT) information between the departure location and the destination location, and the first map is unmatched by the third map in map data format.

In at least one example of the method, the second map matches the third map in map data format.

In at least one example of the method, the method further comprises transmitting at least one of a current location of the vehicle, a duration of time to reach the destination location, TBT information, or the detour information to the service platform through the wireless communication network.

In at least one example of the method, the method further comprises providing, by the service platform, the at least one of the current location of the autonomous vehicle, the duration of time to reach the destination point, the TBT information, or the detour information to the user according to the first map.

In at least one example of the method, the second route or the third route comprises TBT information between the departure location and the destination location.

In at least one example of the method, the method further comprises inputting, by the user, the departure location and the destination location using the first map provided by the service platform using the call SW, or inputting, by the user, the departure location and the destination location by use of a fourth map which is received from an external navigation device and provided by the service platform to the user.

As described above, the autonomous driving system and the method of operating the autonomous driving in a heterogeneous SD map and HD map environment (hereinafter, a heterogeneous SD/HD map environment) according to an example of the present disclosure may perform autonomous driving using a heterogeneous SD map instead of a matching-based SD map for autonomous driving, generate detour information by collecting road information or traffic situation information during autonomous driving, and readily set a detour route based on the generated detour information, through a heterogeneous SD/HD map interface for autonomous driving. In addition, it may implement an autonomous driving and mobility service that embraces various service platform operators depending on what information is added to the interface. In this case, the service may be implemented even if a mobility service operator such as a bus or a subway train that simply shows coarse driving information does not own a SD map navigation solution. In addition, in the case of the mobility service that shows detailed driving information, a mobility service operator may specialize it as its own navigation solution, and may not need to perform a supplementary task of changing a heterogeneous SD map to a SD map matching a HD map or changing the HD map to use it for the mobility service for autonomous driving.

The present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a read-only memory (ROM), a random-access memory (RAM), a CD-ROM, a magnetic tape, a floppy disk, an optical data storage device, etc.

Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

What is claimed is:

1. An autonomous driving system for a vehicle comprising:
    at least one processor; and
    a memory storing instructions that, when executed by the at least one processor, cause the autonomous driving system to perform:
        receiving, from an external navigation device and based on an input of a user corresponding to a first map displayed by the external navigation device, a departure location and a destination location;
        based on the departure location and the destination location, generating, using a second map different from the first map, that comprises different properties compared to the first map, a first route associated with a global path;
        generating, using a third map, different from the first map and the second map, that shares one or more properties with the second map, a second route, associated with a local path, matching the first route;
        causing the vehicle to initiate travel along the second route in an autonomous driving mode;
        receiving from one or more sensors of the vehicle and during travel, by the vehicle in the autonomous driving mode, along the second route, surrounding information;
        based on determining that the surrounding information indicates that a traffic level of the second route that satisfies a threshold, generating a third route; and
        causing the vehicle to initiate travel along the third route in the autonomous driving mode.

2. The autonomous driving system of claim 1, wherein the generating the third route comprises generating the third route based on object information, associated with the third map, that allows the vehicle to deviate from the second route.

3. The autonomous driving system of claim 2, wherein the generating the third route further comprises:
    generating detour information; and
    generating, based on the detour information, the third route.

4. The autonomous driving system of claim 3, wherein the detour information comprises road information associated with the second map that matches the object information.

5. The autonomous driving system of claim 1, wherein properties associated with the first map are unmatched by properties associated with the third map.

6. The autonomous driving system of claim 1, wherein one or more second properties associated with the second map match one or more second properties associated with the third map.

7. The autonomous driving system of claim 1, wherein at least one of the second route or the third route comprise turn-by-turn (TBT) information between the departure location and the destination location, and wherein the TBT information includes at least one of directions:
    going straight;
    turning left;
    turning right; or
    making a U-turn.

8. The autonomous driving system of claim 1, wherein the instructions, when executed by the at least one processor, further cause the system to transmit, to a server and via a wireless communication network, at least one of:
    a current location of the vehicle;
    a duration of time to reach the destination location;
    turn-by-turn information; or
    detour information.

9. An autonomous driving system comprising:
    a server, and
    a computing device in a vehicle,
    wherein the server is configured to:
        receive, from an external navigation device and based on an input of a user corresponding to a first map displayed by the external navigation device, a departure location and a destination location; and
    wherein the computing device comprises:
        at least one processor, and
        memory storing instructions that, when executed by the at least one processor, cause the vehicle to perform:
            based on the departure location and the destination location, generating, using a second map, different from the first map, that comprises different properties compared to the first map, a first route associated with a global path;
            generating, using a third map, different from the first map and the second map, that shares one or more properties with the second map, a second route, associated with a local path, matching the first route;
            causing the vehicle to initiate travel along the second route in an autonomous driving mode;
            receiving, from one or more sensors of the vehicle and during travel, by the vehicle in the autonomous driving mode, along the second route, surrounding information;
            based on determining that the surrounding information indicates that a traffic level of the second route that satisfies a threshold, generating a third route; and
            causing the vehicle to initiate travel along the third route in the autonomous driving mode.

10. The autonomous driving system of claim 9, wherein the server is further configured to:
    output at least one of:
        a current location of the vehicle;
        a duration of time to reach the destination location;
        turn-by-turn information; or
        detour information.

11. A method for autonomous driving for a vehicle, the method comprising:
    receiving, from an external navigation device and based on an input of a user corresponding to a first map displayed by the external navigation device, a departure location and a destination location;
    based on the departure location and the destination location, generating, using a second map, different from the first map, that comprises different properties compared to the first map, a first route;
    generating, using a third map, different from the first map and the second map, that shares one or more properties with the second map, a second route, associated with a local path, matching the first route; and causing the vehicle to initiate travel along the second route in an autonomous driving mode;

receiving, from one or more sensors of the vehicle and during travel, by the vehicle in the autonomous driving mode, along the second route, surrounding information;

based on determining that the surrounding information indicates that a traffic level of the second route that satisfies a threshold, generating a third route; and causing the vehicle to initiate travel along the third route in the autonomous driving mode.

12. The method of claim 11, wherein the generating the third route comprises generating the third route based on object information, associated with the third map, that allows the vehicle to deviate from the second route.

13. The method of claim 12, wherein the generating the third route further comprises:

generating detour information; and generating, based on the detour information, the third route.

14. The method of claim 13, wherein the detour information comprises road information associated with the second map that matches the object information.

15. The method of claim 11, wherein at least one of the second route or the third route comprise turn-by-turn (TBT) information between the departure location and the destination location, and wherein the TBT information includes at least one of directions:

going straight;
turning left;
turning right; or
making a U-turn.

16. The method of claim 15, wherein one or more second properties associated with the second map match one or more second properties associated with the third map.

17. The method of claim 13, further comprising:

outputting, via a wireless communication network, at least one of:

a current location of the vehicle;
a duration of time to reach the destination location;
turn-by-turn (TBT) information; or
the detour information.

18. The method of claim 17, further comprising:

receiving, from a server, the third map.

19. The method of claim 11, wherein one or more of the second route or the third route comprise turn-by-turn information between the departure location and the destination location.

20. The method of claim 11, wherein the generating the third route comprises:

providing via the external navigation device, an interface for the user to input, via a fourth map, the departure location and the destination location.

* * * * *